US008925069B2

(12) United States Patent
Louboutin et al.

(10) Patent No.: US 8,925,069 B2
(45) Date of Patent: Dec. 30, 2014

(54) ACCESSORY DEVICE AUTHENTICATION USING LIST OF KNOWN GOOD DEVICES MAINTAINED BY HOST DEVICE

(71) Applicant: Apple Inc., Cupertino, CA (US)

(72) Inventors: Sylvain Louboutin, Sunnyvale, CA (US); Lawrence G. Bolton, Mahomet, IL (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/735,899

(22) Filed: Jan. 7, 2013

(65) Prior Publication Data

US 2014/0196142 A1  Jul. 10, 2014

(51) Int. Cl.
*G06F 21/44* (2013.01)
(52) U.S. Cl.
CPC ...................................... *G06F 21/44* (2013.01)
USPC ................................ 726/16; 726/4; 713/168
(58) Field of Classification Search
CPC .. H04W 12/06; H04W 88/02; H04L 2209/80; H04L 9/3247; G06F 21/32; G06F 21/35
USPC ......................................... 726/16, 4; 713/168
See application file for complete search history.

(56) References Cited

U.S. PATENT DOCUMENTS

| 7,366,901 | B2 | 4/2008 | Hapamas et al. |
| 8,090,616 | B2 | 1/2012 | Proctor, Jr. et al. |
| 8,208,853 | B2 * | 6/2012 | Lydon et al. ................. 455/41.2 |
| 8,238,811 | B2 * | 8/2012 | Lydon .......................... 455/3.03 |
| 8,509,691 | B2 * | 8/2013 | Lydon et al. ................. 455/41.2 |
| 8,634,761 | B2 * | 1/2014 | Lydon .......................... 455/3.03 |
| 2009/0094681 | A1 * | 4/2009 | Sadler et al. ...................... 726/4 |
| 2010/0075604 | A1 * | 3/2010 | Lydon et al. ................. 455/41.3 |
| 2010/0173673 | A1 * | 7/2010 | Lydon .......................... 455/557 |
| 2010/0274859 | A1 * | 10/2010 | Bucuk .......................... 709/206 |
| 2011/0119491 | A1 | 5/2011 | Nocera |
| 2011/0167262 | A1 * | 7/2011 | Ross et al. .................... 713/168 |
| 2012/0171961 | A1 * | 7/2012 | Qi et al. ....................... 455/41.2 |
| 2012/0272297 | A1 * | 10/2012 | Lydon ............................... 726/4 |
| 2012/0278882 | A1 * | 11/2012 | Lydon et al. .................... 726/17 |

* cited by examiner

*Primary Examiner* — Haresh N Patel
(74) *Attorney, Agent, or Firm* — Kilpatrick Townsend & Stockton LLP

(57) ABSTRACT

Authentication techniques for electronic devices can provide more seamless communication between two devices. A first device (e.g., a host device) can maintain a list of known-good devices (e.g., accessory devices) with which it can interoperate. Information identifying a second device can be added to the known-good list when the second device successfully connects to the first device and completes an authentication process. After the second device disconnects, the first device can retain the identifying information on the known-good list for a predetermined period of time, after which the information can expire. If the second device reconnects to the host before its information expires, the authentication process can be bypassed.

25 Claims, 6 Drawing Sheets

ACCESSORY DEVICE AUTHENTICATION USING LIST OF KNOWN GOOD DEVICES MAINTAINED BY HOST DEVICE

BACKGROUND

The present disclosure relates generally to communication between electronic devices and in particular to device authentication using lists of known good and/or known bad devices.

Portable electronic devices, such as smart phones, tablet computers, media players, and the like, have become ubiquitous. Various accessories have been created to interoperate with portable electronic devices to extend their functionality and/or enhance the user experience. Examples of accessories include chargers, speaker docks, in-vehicle docks that provide options for controlling the portable device using the vehicle's console, workout equipment, health monitoring accessories (e.g., heart rate, blood pressure or glucose meters), and so on. Accessories can be designed to interoperate with multiple portable electronic devices that may differ in their form factor and capabilities (e.g., processing power; firmware version; battery life, presence or absence of cameras, microphones, or other components) and may connect to various portable devices using wired and/or wireless interfaces.

To provide a reliably pleasant experience for a user operating a portable device in conjunction with an accessory, it can be desirable to limit interoperation to authorized accessories. For example, upon connecting to a portable device, the accessory can be required to provide identifying information and/or perform authentication. These processes, however, take time to complete and can be disruptive to the user experience.

SUMMARY

Certain embodiments of the present invention provide authentication techniques for electronic devices that can provide more seamless communication between two devices. In some embodiments, one device (e.g., a host device) can maintain a list of known good devices (e.g., accessory devices) with which it can interoperate. Information about an accessory device can be added to the known-good list when the accessory successfully connects to the host device and completes an authentication process. After the accessory disconnects, the host can retain the accessory information on the known-good list for a predetermined period of time, after which the information expires (e.g., is removed from the list or marked invalid or otherwise designated as expired). If the accessory reconnects to the host before its information expires, the authentication process can be bypassed, allowing the host device and accessory to resume communication more quickly after an interruption.

Certain aspects of the invention relate to methods for communicating between a first electronic device (e.g., a host device such as a portable computing device) and a second electronic device (e.g., an accessory device). A first device can establish a connection to a second device via a communication channel (e.g. a wired or wireless interface), and establishing the connection can include receiving a unique device identifier from the second device (e.g., a MAC address or any other information unique to a particular electronic device). The first device can determine whether the received device identifier is included in a list of known-good device identifiers that it maintains. If the received identifier is not included in the list, the first device and the second device can perform an authentication operation via the communication channel. If the authentication operation completes successfully, the first device can allow the second device to interoperate with the first device and can add the unique device identifier of the second device to the list of known-good device identifiers. If, however, the received identifier is included in the list (e.g., because the second device previously authenticated successfully), the first device can allow the second device to interoperate without performing the authentication operation. Thus, authentication can be bypassed for devices on the known-good list.

In some embodiments, if the unique device identifier is not included in the list of known-good device identifiers, the first device can obtain configuration information from the second device. If the authentication operation completes successfully, the first device can store the configuration information in association with the unique device identifier of the second device. When a known-good device (i.e., a device whose unique device identifier is included in the list of known-good device identifiers) reconnects, the first device can access the stored configuration information. Thus, a known-good device need not re-provide its configuration information upon reconnecting to a device to which it has previously connected.

In some embodiments, the first device can also remove accessory identifiers from the known-good list. For example, the first device can detect that the second device has become disconnected from a communication channel or port. In response to detecting this occurrence, the first device can initiate a timeout period. If the unique device identifier is not received again before the timeout period elapses, the first device can remove the unique device identifier from the list of known-good devices. In that case, if the second device subsequently reconnects, it can be required to re-authenticate.

In some embodiments, the first device can have multiple ports, each of which is capable of communicating with a different device. A single list of known-good devices can be shared across multiple ports, or different lists of known-good devices can be maintained for each port. In the former case, a device can disconnect from one port and reconnect on a different port, and authentication can be bypassed provided that the device provides the same identifier on each port and provided that the device's identifier is still on the known-good list when the device reconnects.

In some embodiments, the first device can maintain a list of known-bad device identifiers in addition to or instead of a list of known-good device identifiers. For example, a first device (e.g., a host device) can receive an identifier of a second device (e.g., an accessory) on a communication port. If the received identifier is on a list of known-bad device identifiers, the first device can prevent the second device from interoperating with the first device; in some embodiments, the authentication process is not invoked. If the received identifier is on a list of known-good device identifiers, the second device can be allowed to interoperate with the first device, bypassing authentication. If the received identifier is not on either list, the first device can perform an authentication operation with the second device via the communication port. If this operation completes successfully, the received device identifier can be added to the list of known-good device identifiers, and the second device can be allowed to interoperate with the first device. If the authentication operation does not complete successfully, the second device can be prevented from interoperating with the first device.

In some embodiments, the list of known-bad device identifiers can be updated based on failed authentication operations. For example, if authentication does not complete successfully, the received device identifier can be added to the list of known-bad device identifiers. As another example, the first device can maintain a failure counter associated with the received device identifier and can increment the failure counter if the authentication operation fails; if the counter reaches a maximum value (the value can be a matter of design choice), the first device can add the received device identifier to the list of known-bad device identifiers.

In some embodiments, the first device can also lock out a port (e.g., preventing connections by any devices) based on authentication failures and/or attempts to connect by devices with identifiers on the known-bad list. For example, the first device can maintain a failure counter associated with a communication port, and the counter can be incremented in response to a failed authentication operation and/or receipt of a device identifier that is on the list of known-bad device identifiers. If the failure counter associated with the port reaches a maximum value (the value can be a matter of design choice), the first device can lock out the port for a predetermined period of time (the period can also be a matter of design choice and can be long enough to be noticeable to a user).

The following detailed description together with the accompanying drawings will provide a better understanding of the nature and advantages of the present invention.

DETAILED DESCRIPTION

Certain embodiments of the present invention provide authentication techniques for electronic devices that can provide more seamless communication between two devices. In some embodiments, one device (e.g., a host device) can maintain a list of unique identifiers of known good devices (e.g., accessory devices) with which it can interoperate. An identifier of an accessory device can be added to the known-good list when the accessory successfully connects to the host device and completes an authentication process. After the accessory disconnects, the host can retain the accessory identifier on the known-good list for a predetermined period of time, after which the identifier expires and can be removed from the known-good list. If the accessory reconnects to the host before its information expires, the authentication process can be bypassed, allowing the host device and accessory to resume communication more quickly after an interruption.

In addition or instead, in some embodiments, a host device can maintain a list of identifiers of known bad accessories and can refuse to allow a known-bad accessory to attempt to authenticate. The known-bad list can be dynamically populated based on failed authentication attempts associated with a specific identifier.

Figure 1:
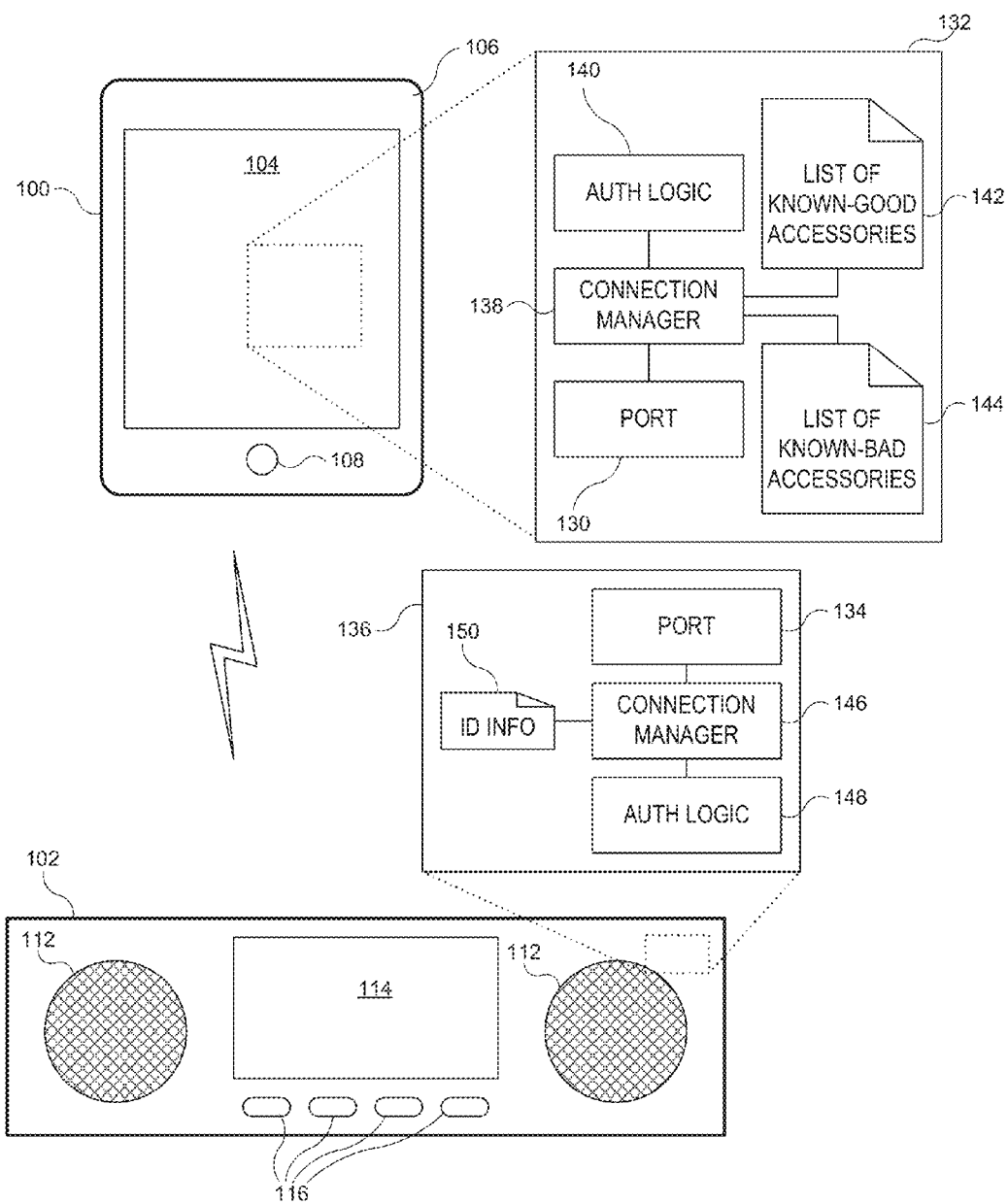
FIG. 1 shows a host device and an accessory according to an embodiment of the present invention.

FIG. 1 shows a host device 100 and an accessory 102 according to an embodiment of the present invention.

Host device 100 can be, for example, a handheld device such as a media player, smart phone, or personal digital assistant; a tablet computer; a laptop computer; a desktop computer; or any other electronic device capable of communicating with other devices. In some embodiments, host device 100 can be a portable device (meaning a device that is easily carried by a user from place to place), but this is not required. In the example shown, host device 100 is a tablet computer with a display area 104 surrounded by bezel 106 and a control button 108. Host device 100 can have various communication interfaces (represented generally as port 130, shown in inset 132) such as connectors (e.g., a USB connector, a Lightning™ connector as used in various portable devices manufactured by Apple Inc., assignee of the present application, or other multi-contact connectors) and/or antennas and supporting circuitry (e.g., supporting Wi-Fi, Bluetooth, cellular voice and/or data network connectivity, or the like), thereby allowing other devices to connect to and communicate with host device 100.

Accessory 102 can be any accessory capable of interacting with host device 102, such as a speaker dock or speaker system, a media console, an automobile head unit, or the like. Accessory 102 can have various user-interface components such as speakers 112, display 114, and user-operable controls 116. Accessory 102 can have various communication interfaces (represented generally as port 134 in inset 136) such as connectors (e.g., a USB connector, a Lightning™ connector, or other multi-contact connectors) and/or antennas and supporting circuitry (e.g., supporting Wi-Fi, Bluetooth, cellular voice and/or data network connectivity, or the like), thereby allowing accessory 102 to connect to and communicate with other devices, such as host device 100.

In some embodiments, accessory 102 can have a plug connector that can be inserted into a complementary receptacle connector of host device 100 to provide electrical and mechanical connections between accessory 102 and host device 100. The electrical connections can include both power and data connections, allowing accessory 102 to deliver power to host device 100 and/or to receive power from host device 100. Such connections can be established directly (e.g., via complementary connectors) or indirectly (e.g., via a cable or adapter). In some embodiments, host device 100 and accessory 102 may be capable of communicating wirelessly, e.g., using radio-frequency communication technology such as Wi-Fi or Bluetooth, near-field communication technology, infrared communication or the like, in addition to or instead of a wired signal path. In some embodiments, multiple communication paths can be concurrently established between host device 100 and accessory 102, with different types of information being selectively routed over different paths.

By communicating with each other, host device 100 and accessory 102 can implement various functionalities. For example, in some embodiments, host device 100 can stream media content for presentation by accessory 102 and can provide status information (e.g., information about a currently playing audio track) to accessory 102 for presentation to the user, e.g., on display 114. A user can operate controls 116 of accessory 102 to control playback of the media asset, e.g., play/pause, or selection of a different asset. As another example, accessory 102 can include a radio receiver (not shown) to receive media content, e.g., from FM, AM, or satellite transmitters. Portable device 100 can be used to control operation of the radio receiver, e.g., channel or program selection. Many other types of interoperation are possible.

To provide a reliable user experience, host device 100 can require that any accessory attempting to establish communication via port 130 first identify and authenticate itself. For example, as shown in inset 132, host device 100 can include a connection manager 138 coupled to port 130 and authentication ("auth") logic 140. Connection manager 138 can maintain a list of known good accessories 142 (also referred to as a "whitelist") and/or a list of known bad accessories 144 (also referred to as a "blacklist"), e.g., in memory or other storage media. In some embodiments, connection manager 138 can use lists 142 and 144 to determine when to invoke authentication logic 140; examples are described below. Accessory 102 can include its own connection manager 146 and authentication logic 148 coupled to accessory port 134. Authentication logic 148 can make use of stored accessory ID info 150.

In operation, connection manager 146 of accessory 102 can attempt to connect port 134 to port 130. As used herein, ports 134 and 130 are said to be connected when data transmission between them is possible. Depending on the particular transport medium being used, connecting ports can include establishing a physical connection, executing a wireless device-discovery and/or service-discovery process, or other operations.

Upon detecting the attempted connection, host port 130 can invoke host connection manager 138 to determine whether the connection is to be allowed. For example, host connection manager 138 can instigate a request to accessory 102 for ID info 150, and accessory connection manager 146 can provide the requested information. The particular information provided as ID info 150 can include information any sufficient to uniquely identify an accessory, such as a manufacturer name, model name, accessory serial number, MAC address (e.g., as used in Bluetooth communication), and/or any other information item or combination of information items usable to distinguish one specific accessory from any another accessory. For example, if the accessory includes a dedicated integrated circuit (chip) that performs authentication functions (e.g., implementing authentication logic 148) and that chip has a unique serial number, this serial number can also be used as ID info 150.

Host connection manager 138 can determine whether received ID info 150 matches information on either known-good list 142 or known-bad list 144. If ID info 150 matches information on known-good list 142, host connection manager 138 can instruct port 130 to allow communication without requiring further authentication, and host device 100 can begin interoperating with accessory 102. If ID info 150 matches information on known-bad list 144, host connection manager 138 can instruct port 130 to refuse the connection.

If ID info 150 does not match information on either known-good list 142 or known-bad list 144, host connection manager 138 can invoke authentication logic 140 to perform a complete authentication process. During this process, accessory 102 may be directed to provide authentication information, such as a digital certificate and/or digital signature; in some embodiments, the authentication process can use digital certificates and public-key encryption techniques that can be implemented in host-side authentication logic 140 and accessory-side authentication logic 148. In some embodiments, during authentication, accessory 102 may also be directed to provide additional configuration information, e.g., information about its identity, capabilities, settings, and/or preferences. This additional configuration information can be incorporated into the authentication process. For example, certain configuration information may be valid only for accessories with particular digital certificates, and a mismatch between the certificate and the configuration information can be interpreted by host device 100 as a failure of the authentication process.

Host-side authentication logic 140 can report the outcome (success or failure) of authentication to connection manager 138. If the outcome is success, connection manager 138 can instruct port 130 to allow communication with accessory 102 and can add ID info 150 to known-good list 142. If the outcome is failure, connection manager 138 can instruct port 130 to refuse the connection and can add ID info 150 to known-bad list 144. In some embodiments, ID info 150 is added to known-bad list 144 only after multiple failed attempts; examples are described below.

Once ID info 150 for a particular accessory 102 has been added to known-good list 142, the information can remain on list 144 for as long as accessory 102 remains connected to port 130 and for a predetermined period of time (a timeout period) after accessory 102 disconnects. The timeout period can be established, e.g., as a constant defined in device firmware. The length of the timeout period is a matter of design choice. In some embodiments, the timeout period is chosen to allow for brief disruptions in a connection (e.g., caused by radio-frequency interference or temporarily moving the devices apart); for example, the timeout period can be 10 seconds, 30 seconds, 1 minute, 5 minutes, 10 minutes, or other durations as desired. In some embodiments where a host device supports multiple communication channels, different timeout periods can be applied to different channels, e.g., 10 seconds for a wired channel and 1 minute for a wireless channel. Allowing a known good accessory to bypass authentication upon reconnection can allow faster resumption of communication between the devices after a short-term interruption, which can contribute to a more seamless user experience.

In some embodiments where accessory 102 provides additional configuration information to host device 100 (before, during, and/or after authentication), host device 100 can store the additional information in association with ID info 150 and can keep the information for at least as long as ID info 150 remains on the known-good list. In such cases, when a known good accessory reconnects, host device 100 can retrieve stored configuration information, thereby reducing or eliminating the need for accessory 102 to resend configuration information upon reconnection. This can also contribute to faster resumption of communication between devices.

Known-bad list 144 can be a persistent list; that is, once ID info 150 for a particular accessory 102 is added to the list, it can remain on the list indefinitely. In some embodiments, known-bad list 144 can persist across firmware updates to host device 100. In some embodiments, known-bad list 144 can be updated through firmware updates, and such updates can include adding identifiers to list 144 and/or removing identifiers from list 144. For example, a provider of firmware for host device 100 may collect information (e.g., from various host devices, from user reports, and/or from its own testing efforts) regarding accessories that are known to cause problems and/or accessories where previously detected problems have been resolved. Accordingly, the updated firmware provided to host device 100 can include data usable by host device 100 to revise known-bad list 144. Such data may include, e.g., a list of known-bad accessory identifiers to be added to list 144 (if not already present) and/or a list of identifiers that can be removed from list 144 (if present).

It will be appreciated that the host device and accessory of FIG. 1 are illustrative and that variations and modifications are possible. A host device and/or an accessory can implement any combination of functionality and can communicate any type of data, signals, or other information, not limited to examples described herein. In some embodiments, in addition to or instead of the host authenticating the accessory, an accessory can authenticate a host. Communication can take place using any type of communication protocol and medium (e.g., wired connections, RF signaling, optical signaling, etc.). Connection managers and authentication logic can be implemented, e.g., as software executable on a programmable processor, as dedicated logic circuits, or any combination thereof. Specific implementations are described below.

Figure 2:
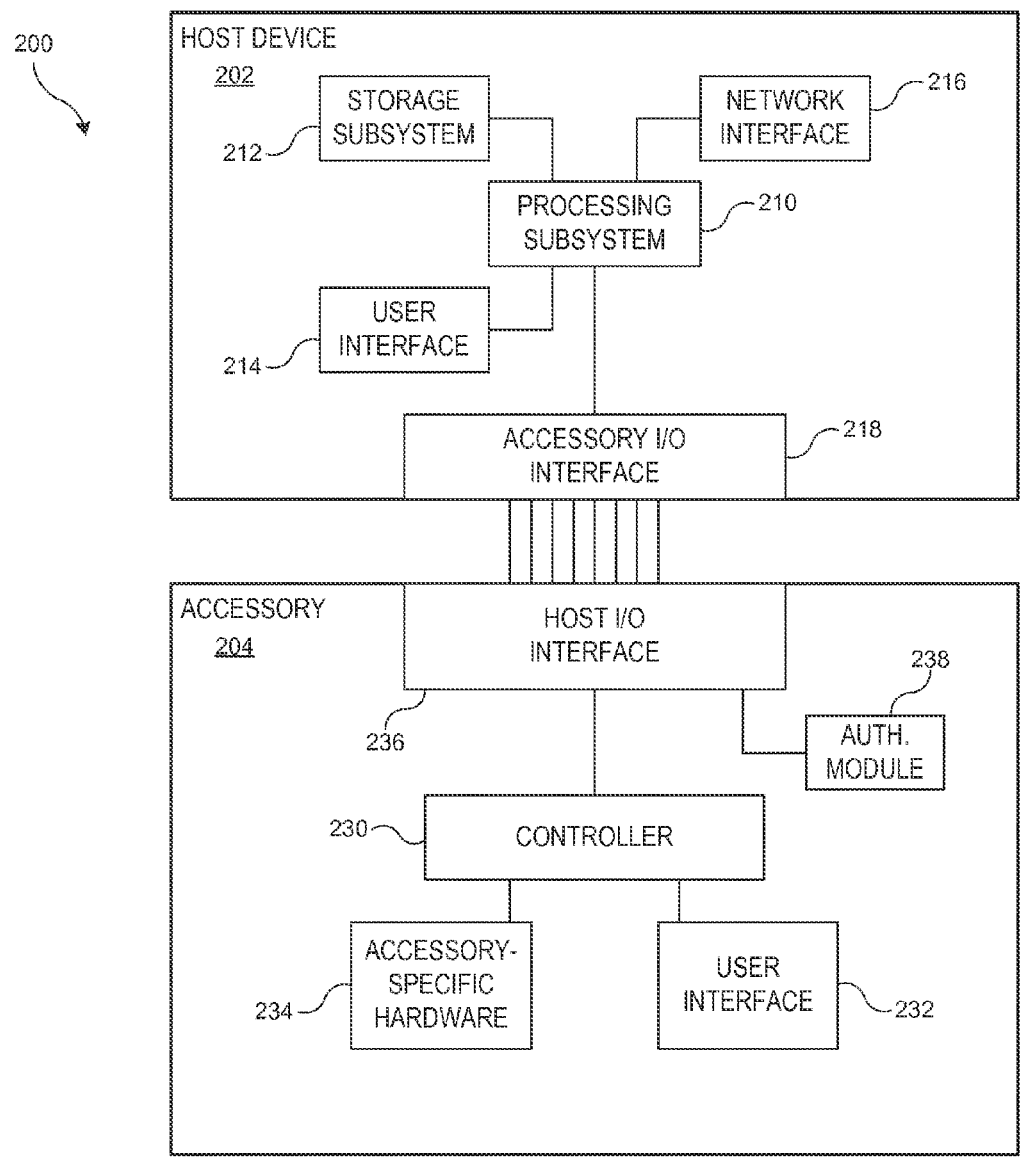
FIG. 2 is a simplified block diagram of a system including a host device and accessory according to an embodiment of the present invention.

A host device and an accessory can be implemented as separate computing devices that communicate via one or more interfaces to support interoperation. FIG. 2 is a simplified block diagram of a system 200 including a host device 202 and accessory 204 according to an embodiment of the present invention. In this embodiment, host device 202 (e.g., implementing host device 100 of FIG. 1) can provide computing, communication, media playback, and/or other capabilities. Host device 202 can include processing subsystem 210, storage device 212, user interface 214, network interface 216, and accessory input/output (I/O) interface 218. Host device 202 can also include other components (not explicitly shown) such as a battery, power controllers, and other components operable to provide various enhanced capabilities.

Storage subsystem 212 can be implemented, e.g., using disk, flash memory, or any other non-transitory storage medium, or a combination of media, and can include volatile and/or non-volatile media. In some embodiments, storage subsystem 212 can store media objects such as audio files, video files, image or artwork files; information about a user's contacts (names, addresses, phone numbers, etc.); information about a user's scheduled appointments and events; notes; and/or other types of information. In some embodiments, storage subsystem 212 can also store one or more application programs to be executed by processing subsystem 210 (e.g., video game programs, personal information management programs, media playback programs, etc.). Storage subsystem 212 can also be used to store known-good list 142 and/or known-bad list 144 of FIG. 1; for example, known-good list 142 can be stored in volatile storage while known-bad list 144 is stored in nonvolatile storage.

User interface 214 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 214 to invoke the functionality of host device 202 and can view and/or hear output from host device 202 via output devices of user interface 214.

Processing subsystem 210 can be implemented as one or more integrated circuits, e.g., one or more single-core or multi-core microprocessors or microcontrollers, examples of which are known in the art. In operation, processing subsystem 210 can control the operation of host device 202. In various embodiments, processing subsystem 210 can execute a variety of programs in response to program code and can maintain multiple concurrently executing programs or processes. At any given time, some or all of the program code to be executed can be resident in processing subsystem 210 and/or in storage media such as storage subsystem 212.

Through suitable programming, processing subsystem 210 can provide various functionality for host device 202. For example, in some embodiments, processing subsystem 210 can implement some or all of host-side connection manager 138 and/or authentication logic 140 of FIG. 1. Processing subsystem 210 can also execute other programs to control other functions of host device 202, including application programs that may be stored in storage subsystem 212; in some embodiments, these application programs may interact with accessory 204, e.g., by generating messages to be sent to accessory 204 and/or receiving messages from accessory 204.

Network interface 216 can provide voice and/or data communication capability for host device 202. In some embodiments, network interface 216 can include radio frequency (RF) transceiver components for accessing wireless voice and/or data networks (e.g., using cellular telephone technology, advanced data network technology such as 3G or EDGE, Wi-Fi (IEEE 802.11 family standards), or other mobile communication technologies, or any combination thereof); components for short-range wireless networking (e.g., using Bluetooth standards); GPS receiver components; and/or other components. In some embodiments network interface 216 can provide wired network connectivity (e.g., Ethernet) in addition to or instead of a wireless interface. Network interface 216 can be implemented using a combination of hardware (e.g., driver circuits, antennas, modulators/demodulators, encoders/decoders, and other analog and/or digital signal processing circuits) and software components.

Accessory I/O interface 218 can allow host device 202 to communicate with various accessories such as accessory 204. For example, accessory I/O interface 218 can support connections to a computer, an external keyboard, a speaker dock or media playback station, a digital camera, a radio tuner, an in-vehicle entertainment system or head unit, an external video device, a memory card reader, and so on. In some embodiments, accessory I/O interface 218 can include a connector, such as connectors corresponding to the connectors used in various iPod®, iPhone®, and iPad® products, as well as supporting circuitry. The connector can provide connections for power and ground as well as for one or more data communication interfaces such as Universal Serial Bus (USB), FireWire (IEEE 1394 standard), and/or universal asynchronous receiver/transmitter (UART). In some embodiments, the connector provides dedicated power and ground contacts, as well as some number (e.g., four) of programmable digital data contacts that can be used to implement different communication technologies in parallel; for instance, two pins can be assigned as USB data pins (D+ and D−) and two other pins can be assigned as serial transmit/receive pins (e.g., implementing a UART interface); the assignment of pins to particular communication technologies can be negotiated while the connection is being established. In some embodiments, the connector can also provide connections for audio and/or video signals, which may be transmitted to or from host device 202 in analog and/or digital formats. Thus, accessory I/O interface 218 can support multiple communication channels, and a given accessory can use any or all of these channels. In some embodiments, accessory I/O interface 218 can support wireless communication (e.g., via Wi-Fi, Bluetooth, or other wireless protocols) in addition to or instead of wired communication channels. Accessory I/O interface 218 can implement one or more communication ports such as port 130 of FIG. 1.

Accessory 204 (e.g., implementing accessory 102 of FIG. 1) can include controller 230, user interface device 232, accessory-specific hardware 234, host I/O interface 236, and authentication module 238. Accessory 204 is representative of a broad class of accessories that can interoperate with a host device, and such accessories can vary widely in capability, complexity, and form factor. Various accessories may include components not explicitly shown in FIG. 2, including but not limited to storage devices (disk, flash memory, etc.)

with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on. In addition, some accessories may provide an additional interface (not shown) that can connect to and communicate with another accessory.

Controller 230 can include, e.g., one or more single-core or multi-core microprocessors and/or microcontrollers executing program code to perform various functions associated with accessory 204. For example, where accessory 230 incorporates a user-operable control (e.g., controls 116 of FIG. 1), controller 230 can interpret user operation of the control and responsively invoke functionality of accessory 204; in some instances, the invoked functionality can include sending messages to and/or receiving messages from host device 202. As another example, controller 220 can implement some or all of accessory-side connection manager 146 of FIG. 1. In some embodiments, controller 230 can have associated storage media (not shown) and can execute program code stored on such media to implement various aspects of accessory functionality.

User interface 232 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 204, a user can operate input devices of user interface 232 to invoke functionality of accessory 204.

Accessory-specific hardware 234 can include any other components that may be present in accessory 204 to support its functionality. For example, in various embodiments accessory-specific hardware 234 can include one or more storage devices using fixed or removable storage media; a GPS receiver; a network interface; a power supply and/or power management circuitry; environmental sensors (e.g., temperature sensor, pressure sensor, accelerometer, chemical sensor, etc.); and so on. It is to be understood that any type of accessory functionality can be supported by providing appropriate accessory-specific hardware 234.

Host I/O interface 236 can allow accessory 204 to communicate with host device 202. In accordance with some embodiments of the invention, host I/O interface 236 can include a connector that mates directly with a connector included in host device 202, such as a connector complementary to the connectors used in various iPod®, iPhone®, and iPad® products. Such a connector can be used to supply power to host device 202 and/or receive power from host device 202, to send and/or receive audio and/or video signals in analog and/or digital formats, and to communicate information using one or more data communication interfaces such as USB, UART, and/or FireWire. Other connectors may also be used; for example, host I/O interface 236 can incorporate a standard USB connector and can connect to accessory I/O interface 218 of host device 202 via an adapter cable. In other embodiments, host I/O interface 236 can support wireless communication (e.g., via Wi-Fi, Bluetooth, or other wireless protocols) in addition to or instead of wired communication channels. Host I/O interface 236 can implement communication ports such as port 134 of FIG. 1

Authentication module 238 can provide authentication information to host device 202, implementing all or part of accessory authentication logic 148 of FIG. 1. For example, authentication module 238 can store a digital certificate that can be provided to host device 202 when a connection is established between host I/O interface 236 and accessory I/O interface 218. Authentication module 238 can also include cryptographic logic. In some embodiments, to verify the identity of accessory 204, host device 202 can send a random nonce to be encrypted by accessory 204 using a private key, and authentication module 238 can store the private key as well as programmed or hardwired control logic to use the stored private key to encrypt the random nonce. (This option is sometimes referred to as digital signature verification, and the encrypted nonce is said to be "signed" by the accessory.) A variety of authentication mechanisms and algorithms can be implemented.

Accessory 204 can be any electronic apparatus that interacts with host device 202. In some embodiments, accessory 204 can provide remote control over operations of host device 202, or a remote user interface that can include both input and output controls (e.g., a display screen to display current status information obtained from host device 202). Accessory 204 in various embodiments can control any function of host device 202 and can also receive data objects from host device 202. In other embodiments, host device 202 can control operations of accessory 204, such as retrieving stored data from a storage medium of accessory 204, initiating an image capture operation by a camera incorporated into accessory 204, etc.

It will be appreciated that the system configurations and components described herein are illustrative and that variations and modifications are possible. The host device and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a host device can have some functionality that is not accessible or invocable via an accessory device; likewise, an accessory device can have some functionality that is not accessible or invocable via a host.

Connectors at the respective I/O interfaces 218, 236 of host device 202 and accessory 204 can be complementary or not as desired. Where two connectors are not complementary, an adapter (not shown) can be provided to connect the two devices. While connectors may be described herein as having pins, a term generally associated with conventional electronic devices having wires to connect components, it is to be understood that other signal paths (e.g., optical signaling) can be substituted. Further, in some embodiments, some or all of the connections can be wireless, and connectors can be omitted where wireless interfaces are provided.

Further, while the host device and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Accessory I/O interface 218 of host device 202 and host I/O interface 236 of accessory 204 allow host device 202 to be connected with accessory 204 and subsequently disconnected from accessory 204. As used herein, a host device and an accessory are "connected" whenever a communication channel is established between their respective interfaces and "disconnected" when the channel is terminated. Such connection can be achieved via direct physical connection, e.g., with mating connectors; indirect physical connection, e.g., via a cable; and/or wireless connection, e.g., via Bluetooth or Wi-Fi.

In some embodiments, a host device and an accessory can communicate while connected by exchanging messages and data according to an "accessory protocol." The messages and data can be communicated, e.g., using any wired or wireless transport medium provided by the relevant interfaces.

The accessory protocol can define a "universe" of messages that can be exchanged between host device 202 and any accessories connected thereto, such as accessory 204. The message format can include, e.g., a start bit or bit sequence to indicate that what follows is a message code, followed by an actual message code that can be interpreted and acted on by the recipient. At least some of the message codes may have one or more associated parameters defined by the protocol, and a message can include values for any such parameters in addition to the message code. In some instances, the protocol can further specify a behavior for a recipient in the event that a particular parameter associated with a message code is not received or in the event that an unexpected parameter is received with a message code. The number of parameters can be different for different messages, and in some instances, a parameter may have variable length. In some embodiments, the message codes can be defined such that a given message code is valid in only one direction. Other message structures can also be used.

The accessory protocol can also define a format for the exchange of messages. For instance, the accessory protocol may specify that a message is sent using one or more packets, each of which has a header and a payload. The header provides basic information (e.g., a start indicator; length of the packet; packet sequence number; identifier of a session with which the packet is associated), while the payload provides all or part of the message data. The packet can also include error-detection or error-correction codes, examples of which are known in the art.

In some embodiments, the messages can be logically grouped into a "general" message set and an "optional" message set. Every accessory and every host device that use the accessory protocol can be required to support at least the general message set. This message set can include messages enabling the host device and the accessory to identify and authenticate themselves to each other and to negotiate functionality that they will mutually support (including various configuration information). For example, the general message set can include a message the accessory can send to the host device to provide identification and/or configuration information, authentication messages that the host device and accessory can exchange to verify the purported identity of the accessory, and status messages indicating whether a connection is enabled or refused.

The optional message set can include messages related to various functionality that might or might not be supported by a given accessory (or host). In some embodiments, the accessory (or host device) may be blocked from invoking certain (or all) of the optional messages if the authentication is unsuccessful. Examples of optional messages can include simple remote messages that allow an accessory to identify a function of the host device to be invoked, remote user interface messages that can be used to obtain information related to replicating all or part of a user interface of a host device on an accessory (thereby supporting a more advanced remote control), messages that allow a user to control a radio tuner in an accessory by operating a host device and/or to control a radio tuner in a host device by operating an accessory, messages that facilitate transfers of data objects between the host device and the accessory, and so on. Any combination of optional messages can be defined in an accessory protocol, and there is no requirement that a given accessory or host device support all (or even any) of the optional messages.

In certain embodiments of the invention, it is desirable for the host to allow interoperation using the accessory protocol only with accessories that are authorized for such interoperation. Whether an accessory is authorized or not can be determined using an authentication procedure that provides a bypass mechanism for accessories that are reliably recognized as being authorized, e.g., by using a known-good list.

Figure 3:
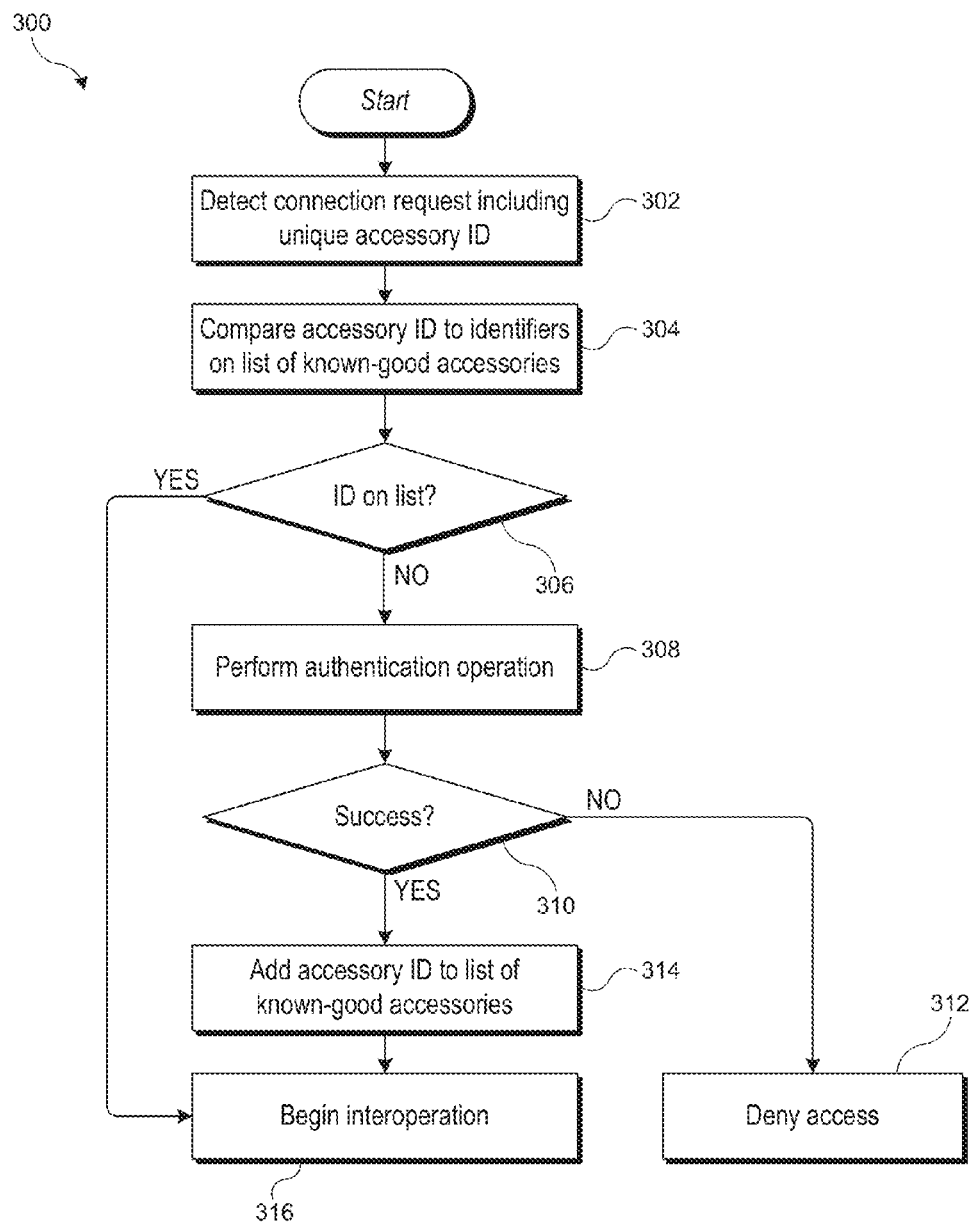
FIG. 3 is a flow diagram of a process for authenticating an accessory according to an embodiment of the present invention.

FIG. 3 is a flow diagram of a process 300 for authenticating an accessory using a known-good list according to an embodiment of the present invention. Process 300 can be implemented in a host device, e.g., host device 100 of FIG. 1 or host device 200 of FIG. 2.

Process 300 begins at block 302, where a host device (e.g., host device 100) detects a connection request from an accessory (e.g., accessory 102). This request, which can be any detectable signal from the accessory, can include an accessory identifier, e.g., ID info 150. The accessory identifier can include any information that uniquely identifies a particular accessory. For example, the combination of manufacturer name, model name, and serial number of the accessory can be a unique identifier. As another example, every Bluetooth transceiver is assigned a unique MAC address. Other wireless protocols can also assign unique addresses to devices, and the addresses can be used as unique accessory identifiers. The request can be transmitted in accordance with the communication protocol used to initially establish communication, which can be but need not be the accessory protocol described above. For instance, a Bluetooth accessory may transmit its MAC address to a host as part of a standard Bluetooth inquiry phase. Other wireless protocols specify that a device attempting to establish a connection should transmit its unique address at a certain point in the connection process, and such transmissions can be leveraged to obtain ID info 150. As another example, some communication standards allow for the inclusion of vendor-specific information in a connection request, and the accessory can provide its identifying information as vendor-specific information.

At block 304, host device 100 can compare the accessory identifier to identifiers on known-good list 142. At block 306, if a match is not found, then at block 308, host device 100 can invoke authentication logic 140 to perform an authentication operation, which can conform to the accessory protocol. For example, the authentication operation can include host device 100 requesting and receiving a digital certificate from the accessory, confirming the validity of the digital certificate (e.g., by comparing it to lists of known good and/or known bad certificates, which can be different from the known-good and known-bad identifier lists), and issuing a random nonce or challenge to the accessory for the accessory to digitally sign using a private key and return; the signed nonce can be verified by the host device using a public key associated with the digital certificate. The authentication requests and responses can be implemented, e.g., using messages in the general message set of the accessory protocol. In some embodiments, it can be assumed that all accessories and all hosts are capable of sending and receiving authentication messages, and failure of an accessory to respond properly (or to respond at all) to an authentication message can be interpreted by the host as failure of the authentication process. In some embodiments, all or part of the digital certificate data and associated encryption logic for the accessory can be implemented in an authentication chip that can be part of authentication logic 148. Similarly, all or part of the digital certificate verification and encryption logic used by the host can be implemented in an authentication chip that can be part of authentication logic 140. The logic for either device can also be implemented in executable code for a programmable processor.

Block 308 can also include exchanging other configuration-related messages, e.g., information related to the functionality the accessory intends to invoke during interoperation with the host device, capabilities of the accessory (e.g., communication capabilities, output and/or input devices, etc.), and/or preferences pertaining to various optional settings of the host device and/or the accessory (e.g., data format selections, sound settings, whether notifications of certain events or conditions should be sent or not sent). In some embodiments, configuration messages can be used in determining whether authentication succeeds or fails. For example, if a configuration message is improperly formatted, internally inconsistent, or otherwise invalid, this can be treated by process 300 as a failure of the authentication operation. As another example, a host device may restrict access to certain functionality based on the particular digital certificate presented by the accessory (or some other aspect of the authentication operation); if an accessory requests access to a restricted functionality but does not have the correct certificate, the host device can process this occurrence as a failed authentication operation.

At block 310, host device 100 can determine whether the authentication operation succeeded or failed. If the operation failed, host device 100 can deny further access at block 312, e.g., by instructing port 130 to close its connection to accessory 102. After port 130 is closed, accessory 102 can try again to establish a connection, in which case process 300 would begin again at block 302.

If, at block 310, host device 100 determines that the authentication operation succeeded, then at block 314, host device 100 can add the identifier of accessory 102 to known-good list 142. Host device 100 can also add other information about accessory 102 to known-good list 142 (e.g., some or all of the configuration information obtained at block 308), such that the information is associated with and accessible by reference to the accessory identifier received at block 302. Accessory configuration information can be physically stored in the same location as known-good list 142 or in a different storage location that is referenced by the entry in known-good list 142. In some embodiments, configuration information for an accessory remains stored by host device 100 for at least as long as an entry for that accessory remains on known-good list 142.

In some embodiments, known-good list 142 can also include a state indicator that indicates whether accessory 102 is currently connected, and block 314 can include setting the indicator to the "connected" state.

At block 316, host device 100 and accessory 102 can begin interoperation. In some embodiments, beginning interoperation can include host device 100 sending a message (e.g., a general message of the accessory protocol) to accessory 102 to confirm that the accessory is now allowed to interoperate.

Referring again to block 306, if the accessory identifier received at block 302 is already on known-good list 142, the identification and authentication process at block 308 can be bypassed, and host device 100 and accessory 102 can immediately begin interoperating at block 316. In this scenario, if configuration information for accessory 102 was stored at block 314 (as described above), host device 100 can retrieve the configuration information, e.g., by referencing known-good list 142.

Once interoperation begins at block 316, it can continue indefinitely, until such time as the accessory becomes disconnected from the host. For instance, one or both devices might be powered down, moved out of wireless communication range of the other, or physically disconnected.

Figure 4:
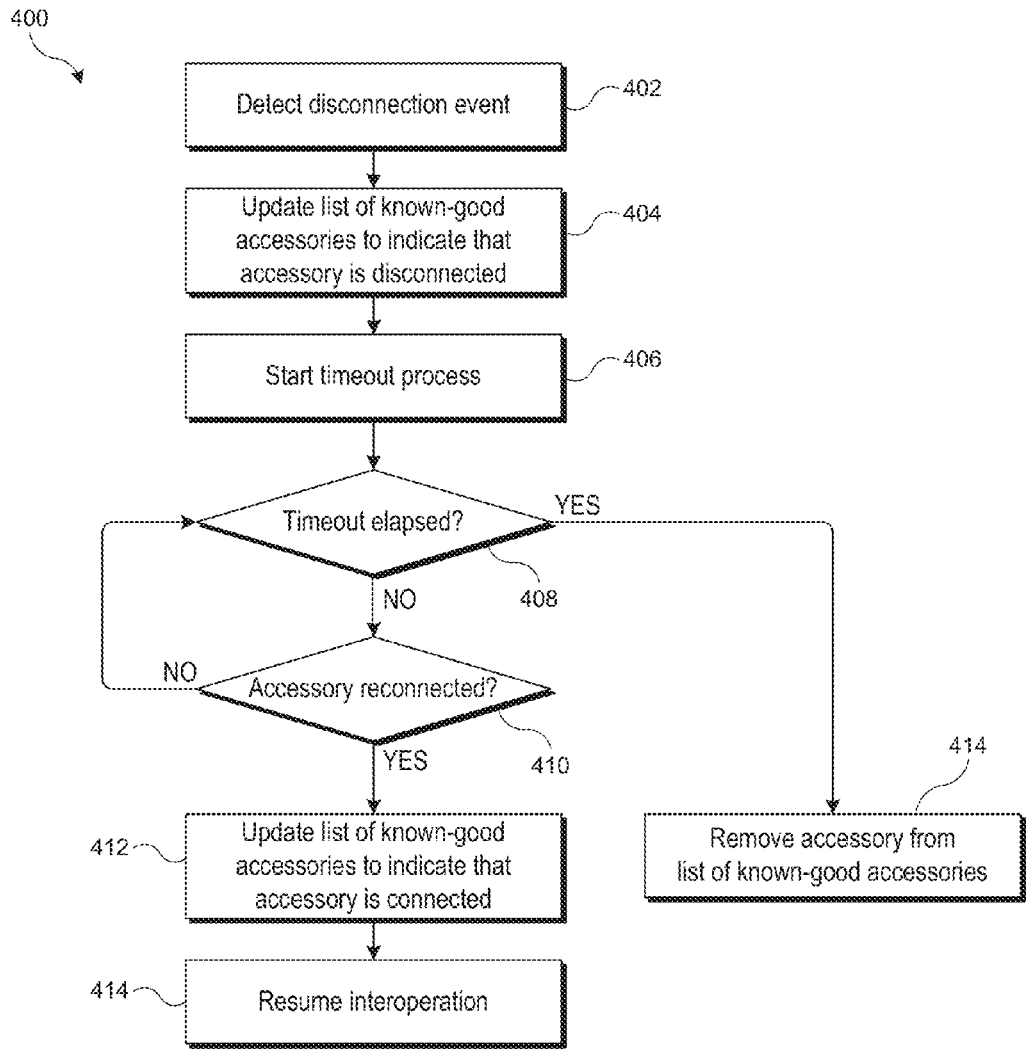
FIG. 4 is a flow diagram of a process for managing a disconnection according to an embodiment of the present invention.

In some embodiments, a disconnection event triggers a process to remove the accessory from the known-good list. FIG. 4 is a flow diagram of a process 400 for managing a disconnection according to an embodiment of the present invention. Process 400 can be implemented in a host device, e.g., host device 100 of FIG. 1 or host device 200 of FIG. 2.

Process 400 begins at block 402, where a host device (e.g., host device 100) detects that an accessory (e.g., accessory 102) that was interoperating with the host device has become disconnected. Disconnection can be detected based on various criteria. For example, host 100 can detect that a message expected from accessory 102 was not received, or host 100 can detect that messages sent to accessory 102 are no longer being acknowledged, or host device 100 can detect that a "presence" signal at the port on which accessory 102 was connected has been discontinued.

At block 404, in response to detecting disconnection, host device 100 can update known-good list 142 to indicate that accessory 102 has become disconnected, e.g., by updating the state indicator associated with the accessory identifier from the "connected" state to a "disconnected" state. In some embodiments, host device 100 can also store information about the state of interoperation with accessory 102 at the time of disconnection. For instance, if host device 100 was in the process of transferring data to accessory 102 when the disconnection occurred, host device 100 can store a record indicating what data was being transferred and which part of the transfer was (or was not) completed prior to the disconnection.

At block 406, host device 100 can start a timeout process to determine whether the information pertaining to accessory 102 in known-good list 142 should expire. Any process capable of detecting when a predetermined time period has elapsed can be used as the timeout process. For instance, host device 100 can add a timestamp to the entry in known-good list 142 to indicate when accessory 102 became disconnected, and the process can compare the timestamp to a current time to determine how much time has elapsed. As another example, a countdown or count-up timer associated with the list entry can be started.

At block 408, host device 100 can determine whether the timeout period associated with known-good list 142 has elapsed. As described above, the timeout period can be a predetermined period specified in the firmware of or hardwired into host device 100 and can be, e.g., 10 seconds, 30 seconds, 1 minute, 5 minutes, 10 minutes, or the like. Determining whether that period has elapsed can be implemented appropriately for the timeout process. For instance, the difference between the disconnection timestamp and the current time can be compared to the predetermined period, or a countdown timer can be initialized when the accessory disconnects to a value such that it runs down to zero at the end of the timeout period, or the count on a count-up timer started when the accessory disconnects can be compared a count corresponding to the timeout period.

If the timeout period has not elapsed, then at block 410, host device 100 can determine whether accessory 102 has reconnected. For example, host device 100 can determine whether it has received a connection request that includes the accessory identifier that was previously sent by accessory 102 and stored in known-good list 142 as described above with reference to FIG. 3.

If accessory 102 has reconnected, then at block 412, host device 100 can update known-good list 142 to indicate that accessory 102 is connected (e.g., by changing the state indicator to indicate the connected state). The timeout process started at block 406 can also be canceled. (If accessory 102 disconnects again, a new timeout period would commence.) At block 414, host device 100 can resume interoperation with accessory 102. For example, host device 100 can send a message (e.g., a general message of the accessory protocol) to accessory 102 to confirm that the accessory is now allowed to interoperate or to confirm that it is not necessary for accessory 102 to repeat the authentication process (e.g., block 308 of FIG. 3). In some embodiments, e.g., where host device 100 stored information about the state of interoperation with accessory 102 at the time of disconnection, host device 100 and accessory 102 can resume interoperation approximately where they left off.

Referring again to block 410, if the accessory does not reconnect, process 400 continues to monitor the timeout period (block 408) until either the accessory reconnects or the timeout period elapses. If the timeout period elapses without the accessory reconnecting, then at block 414, process 400 host device 100 can remove the entry pertaining to accessory 102 from known-good list 142 (or mark it expired, which can have the same effect as removal). If accessory 102 subsequently reconnects, the authentication process (e.g., block 308 of FIG. 3) can be repeated; thus, removal from known-good list 142 does not prevent accessory 102 from reconnecting.

Processes 300 and 400 can be implemented together to restrict interoperation with a host device to authorized accessories (i.e., accessories that successfully authenticate themselves to the host) while permitting an accessory that has recently communicated with the host device to disconnect and reconnect within a predetermined time period without repeating the authentication process. For example, process 300 can add an accessory to a known-good list after it successfully completes an authentication process (block 308) and can allow that process to be bypassed for accessories that are on a known-good list. In addition, a host device using process 300 can store configuration information for known-good accessories so that a known-good accessory does not have to communicate this information again when it reconnects. Process 400 provides a timeout period during which a recently disconnected accessory can remain on the known-good list, thereby allowing that accessory to reconnect and bypass the authentication process (and in some cases sending of configuration information or any other information beyond a unique identifier).

In instances where the communication channel is susceptible to transient disruptions (e.g., Bluetooth or other short-range wireless protocols where devices can easily go in and out of range), more efficient interoperation can result to the extent that less time is consumed in re-authenticating the accessory and/or re-sending configuration information when the devices reconnect. As a result, short-term disruptions in a communication channel may be less noticeable or irritating to a user.

It will be appreciated that processes 300 and 400 are illustrative and that variations and modifications are possible.

Steps described as sequential may be executed in parallel, order of steps may be varied, and steps may be modified, combined, added or omitted. For instance, any unique accessory identifier can be used, and the details of the authentication operation and/or configuration information can be varied. The amount and type of information stored in a known-good list can also be modified. Various timing processes can be used to implement the timeout period in process 400.

Further, in some embodiments, an accessory that remains connected may be required to periodically renew its credentials, e.g., by re-authenticating, in order to remain on the known-good list. For example, an entry in the known-good list for a connected accessory may expire after some relatively long time interval (e.g., 1 hour, 4 hours, 8 hours, etc.) if the accessory does not renew its credentials. The renewal process can be scheduled in a flexible manner so that renewal occurs while other communications are not occurring, in order to avoid or minimize delays in the other communications. Where periodic renewal is not accomplished within the specified period, the host device can either close the connection to the accessory or maintain the connection but remove the accessory from the known-good list so that if the accessory disconnects, it will have to re-authenticate on any subsequent reconnection attempt. In some instances, periodic renewal may facilitate detecting whether an accessory has become disconnected, particularly for transports (e.g., certain wireless transports) where accessory disconnection can go undetected by the host.

The known-good list can be stored in volatile or non-volatile memory as desired. In some embodiments, the known-good list can be cleared in response to specific events at the host device, such as power-down (e.g., entering a sleep state, a power off state, or any other state where ports are disabled). In some embodiments, when the host device enters a low-power state (e.g., a sleep state), all connections to accessories can be closed to conserve power. Where this is the case, the host device can preserve the known-good list while in the low-power state; when the host returns to a power state in which connections to accessories can be open, it can use the preserved known-good list to allow any accessories that were connected when the host entered the low-power state to reconnect without re-authenticating.

In certain embodiments of the present invention, it may be desirable to prevent some accessories from even attempting to authenticate. For example, if a particular accessory is known to be unauthorized, the host device need not devote processing cycles, power, and/or other resources to performing authentication of that accessory. Accordingly, a host device (e.g., host device 100 of FIG. 1) can maintain known-bad list 144 in addition to or instead of known-good list 142. An accessory on known-bad list 144 that attempts to connect can be denied at relatively low resource cost to the host, and accessories can be added to known-bad list 144 based on failed attempts to authenticate.

Figure 5:
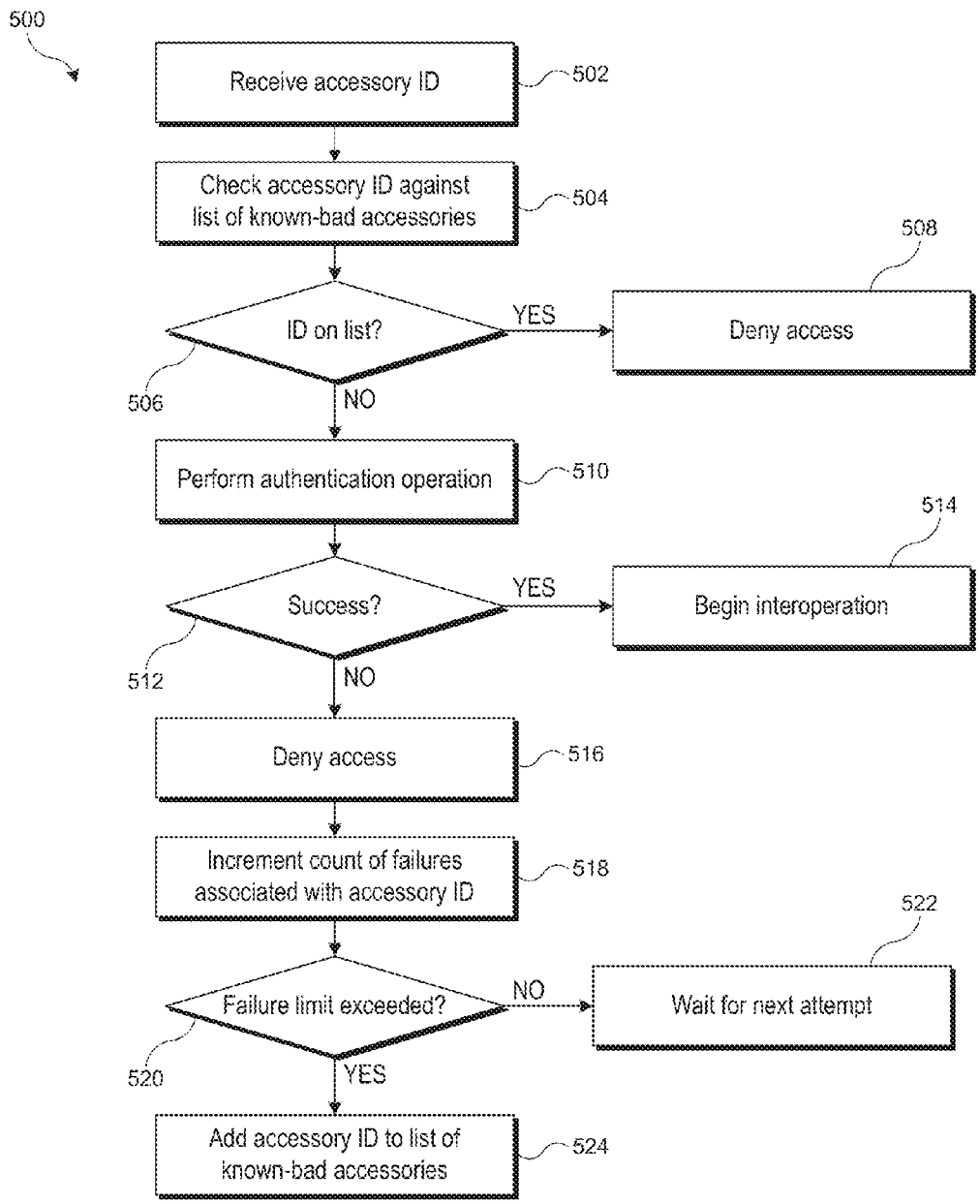
FIG. 5 is a flow diagram of a process for authenticating accessories according to another embodiment of the present invention.

FIG. 5 is a flow diagram of a process 500 for authenticating accessories according to an embodiment of the present invention that implements a known-bad list. Process 500 can be implemented in a host device, e.g., host device 100 of FIG. 1 or host device 200 of FIG. 2.

Process 500 begins at block 502, where a host device (e.g., host device 100) detects a connection request from an accessory (e.g., accessory 102). This request can include an accessory identifier, e.g., ID info 150. The accessory identifier can include any information that uniquely identifies a particular accessory, e.g., any of the identifiers described above in connection with process 300.

At block 504, host device 100 can compare the accessory identifier to identifiers on known-bad list 144. At block 506, if a match is found, then host device 100 can simply deny access at block 508, e.g., by instructing port 130 to close its connection to accessory 102, and process 500 can end. As in process 300, if access is denied by process 500, the accessory can try again, in which case process 500 would begin again at block 502.

If, however, a match to known-bad list 144 is not found at block 506, then at block 510, host device 100 can invoke authentication logic 140 to perform an authentication operation. The operation can be the same as or similar to operations described above with reference to block 308 of FIG. 3 and can include receiving, e.g., a digital certificate, digital signature, and/or configuration information.

At block 512, host device 100 can determine whether the authentication operation succeeded or failed. (This can be similar to the determination in process 300 described above.) If the operation succeeded, then at block 514, host device 100 and accessory 102 can begin interoperation. In some embodiments, beginning interoperation can include host device 100 sending a message (e.g., a general message of the accessory protocol) to accessory 102 to confirm that the accessory is now allowed to interoperate.

If, however, block 512 results in a determination that the authentication operation failed, then at block 516, host device 100 can deny further access by accessory 102 to port 130. Host device 100 can also determine whether to add accessory 102 to known-bad list 144. For example, host device 100 may keep a count of failed attempts at authentication associated with a particular accessory identifier and add the identifier to known-bad list 144 when an upper limit on the number of failures is exceeded. Accordingly, at block 518, host device 100 can increment the failure count associated with the accessory identifier received at block 504, and at block 518, host device 100 can determine whether the failure count exceeds an upper limit. The upper limit can be a matter of design choice, and selecting an optimal value for a particular implementation can depend on tradeoffs among the desired level of device security and acceptable rates of unauthorized access versus denial of access due to glitches in the authentication process. Examples of values for the upper limit can include 0 failures (where preventing unauthorized access is a dominant concern), 1 failure (to accommodate an occasional error), 3 failures (for a more moderate security setting), 10 failures (a relatively loose setting that may be desirable, e.g., where user input is incorporated into authentication), etc.

If, at block 520, the upper limit on the failure count is not exceeded, then at block 522, host device 100 can wait for the next attempt. When the next attempt occurs, process 500 can return to block 502.

If, at block 520, the upper limit on the failure count is exceeded, then at block 524, the accessory identifier received at block 504 can be added to known-bad list 144. Thereafter, subsequent attempts by accessory 102 to connect can be denied at blocks 506 and 508.

It will be appreciated that process 500 is illustrative and that variations and modifications are possible. Steps described as sequential may be executed in parallel, order of steps may be varied, and steps may be modified, combined, added or omitted. For instance, the failure count can be implemented using a decrementing counter that is initialized based on the upper limit in response to the first failure and decrements toward zero (or some other cutoff value) with each subsequent failure.

In some embodiments, the failure counter for a particular accessory identifier (or for all accessory identifiers whose failure count is being tracked) can be cleared in response to certain events. For example, a successful authentication by a given accessory can result in clearing the failure counter for that accessory's identifier. Alternatively, the counter can be a cumulative count of failures that is not affected by any successes that may occur. In some embodiments, powering down the host clears the failure counters; in other embodiments, failure counters can be stored in non-volatile memory and can persist across power-down/power-up events.

Known-bad list 144 can also be persistent to any degree desired. For example, it may be desirable to retain identifiers of known-bad accessories indefinitely, to prevent such accessories from continuing to attempt to connect. Accordingly, in some embodiments, an accessory identifier that has been added to known bad list 144 can be removed only by a firmware update. In other embodiments, an interface may be provided to allow a user or service technician to view and/or modify known-bad list 144; this interface may be accessible, e.g., in a troubleshooting mode.

Locking out an accessory can prevent unauthorized accessories from attempting to connect. In some instances, an accessory that is damaged or defective may also attempt to connect (whether the user intends it or not), and locking out an accessory that repeatedly fails to connect can help prevent damaged or defective accessories from consuming system resources or preventing other accessories from connecting.

Those skilled in the art with access to the present disclosure will recognize that a host device can maintain both a known-good list and a known-bad list, e.g., by combining process 500 with processes 300 and 400. Through the operation of processes 300, 400, and 500, a given accessory can be at various times on either or neither of the host's known-good list or known-bad list (but not on both at once). Thus, for example, when an accessory sends its identifier, the host can compare the identifier to both lists. A match to the known-bad list can result in denying access and closing the communication channel; a match to the known-good list can result in bypassing the authentication process and proceeding to interoperation; and a match to neither list can result in executing the authentication process.

In some embodiments, a host device may have multiple ports capable of connecting to accessories concurrently or at different times. The host device can maintain a separate known-good list and/or known-bad list for each port. Alternatively, the host device can maintain a known-good list and/or known-bad list that is shared across multiple ports (all ports or a subset of ports). In the latter case, an accessory added to a known-good list by virtue of successful authentication on one port can connect or reconnect on a different port without having to repeat the identification and authentication process, and the accessory can remain on the known-good list for as long as it remains connected on at least one port (and for a timeout period following disconnection from all ports). For example, an accessory connecting on a different port can be recognized as a known-good accessory as long as it provides the same unique identifier as it used when it successfully authenticated (i.e., an identifier that is on the known-good list). Likewise, an accessory can be added to a known-bad list based on its total number of failures to connect, regardless of whether different attempts were on the same port or different ports, as long as the accessory sends the same identifier on each attempt.

In addition to locking out particular accessory devices, it may also be desirable to lock out all accessories from accessing a particular port (or all ports), e.g., if a series of events suggests that an unauthorized accessory may be making repeated attempts to gain access. For example, an unauthorized accessory might send a series of different accessory identifiers with the purpose of finding an identifier that is on the known-good list or otherwise permitted to bypass the authentication process, or an accessory might try to authenticate multiple times (e.g., under different identifiers) with the purpose of eventually "guessing" correct responses. Such efforts can be deterred by limiting an accessory's ability to repeatedly attempt to connect and/or authenticate. For example, a host device can infer from repeated failures that an unauthorized accessory is attempting to gain access and can lock out a port entirely, refusing all connections, for a prescribed period of time (e.g., 15 minutes, 30 minutes, 1 hour, or more). A long lockout time, during which no accessories can connect, may result in significant inconvenience to a user, which can deter the user from attempting to connect unauthorized accessories.

Figure 6:
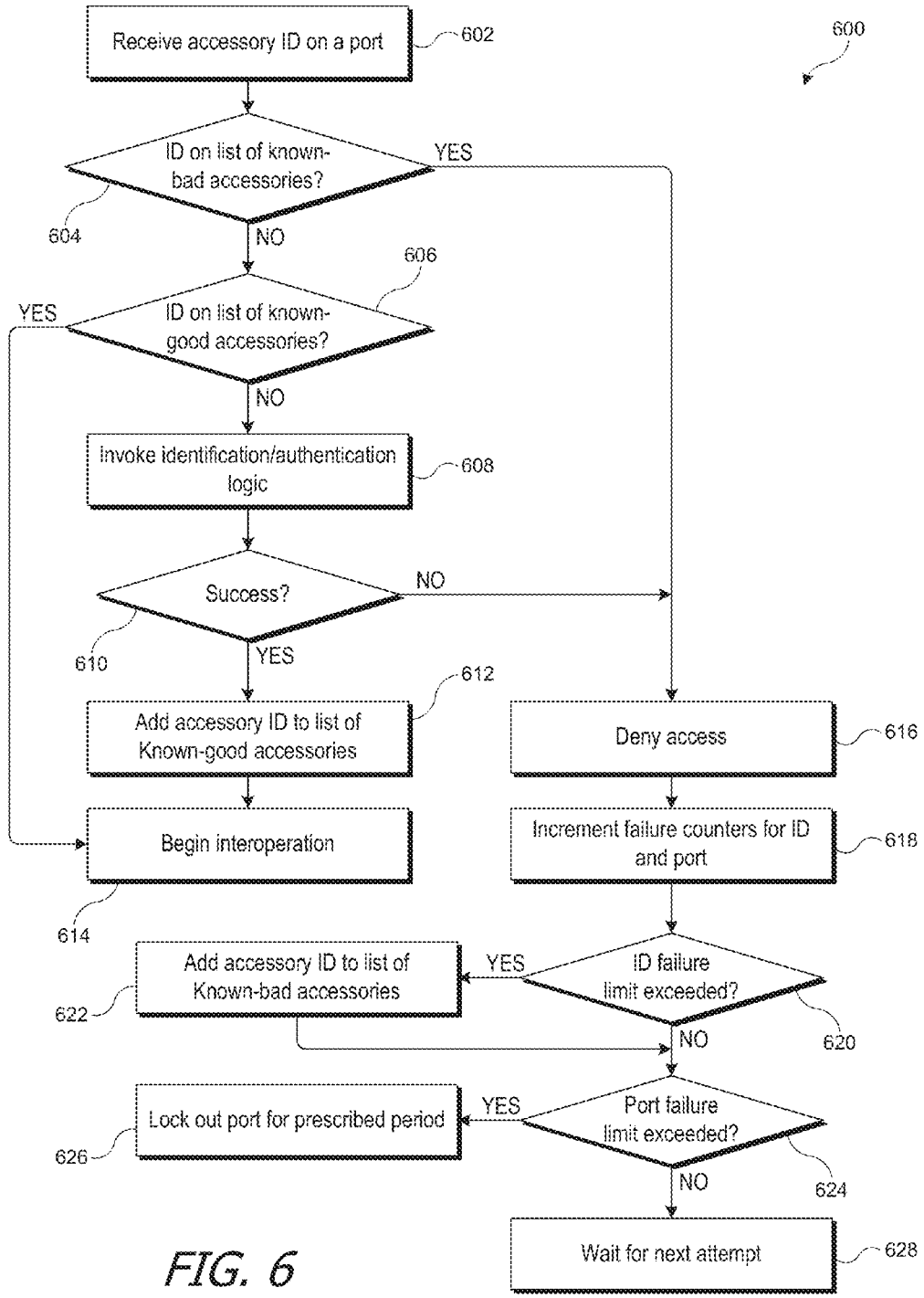
FIG. 6 is a flow diagram of a process authenticating accessories according to another embodiment of the present invention.

FIG. 6 is a flow diagram of a process 600 for providing a port lockout in conjunction with a known-good list and a known-bad list according to an embodiment of the present invention. Process 600 can be implemented in a host device, e.g., host device 100 of FIG. 1 or host device 200 of FIG. 2.

Process 600 begins at block 602, where a host device (e.g., host device 100) detects a connection request from an accessory (e.g., accessory 102). This request can include an accessory identifier, e.g., ID info 150. The accessory identifier can include any information that uniquely identifies a particular accessory, e.g., any of the identifiers described above in connection with process 300.

At block 604, host device 100 can determine whether the accessory identifier is on known-bad list 144. If not, then at block 606, host device 100 can compare the accessory identifier to identifiers on known-good list 142. If the accessory identifier is not on either list, then at block 608, host device 100 can invoke authentication logic 140 to perform authentication operations. These operations can be the same as or similar to operations described above with reference to block 308 of FIG. 3, and in some embodiments, the operations can incorporate additional configuration information received from the accessory.

At block 610, host device 100 can determine whether the authentication operations succeeded or failed. If the operations succeeded, then at block 612, host device 100 can add the accessory identifier received at block 602 to known-good list 142, and at block 614, host device 100 can begin interoperating with accessory 102. These blocks can be similar to blocks 314 and 316 of process 300 described above. Similarly to process 300, after the accessory identifier has been added to known-good list 142, host device 100 can allow accessory 102 to bypass the authentication operations (block 608) for as long as the identifier of accessory 102 remains on known-good list 142. Process 400 or a similar process can be implemented to remove accessory identifiers from known-good list 142.

Referring again to blocks 604 and 610, these blocks illustrate two circumstances in which an attempted connection can fail: at block 604, the received accessory identifier may be found on known bad list 144, and at block 610, the authentication operations of block 608 may result in failure. In either case, process 600 can deny access at block 616 (similarly to block 312 of process 300 or block 508 of FIG. 5).

Where access is denied, host device 100 can determine whether to add the received accessory identifier to the known-bad list and/or lock out the port entirely. For example, at block 618, host device 100 can increment two failure counters: one associated with the accessory identifier (e.g., as described above with reference to FIG. 5) and one associated with the port on which the denied connection was attempted.

At block 620, host device 100 can determine whether the failure counter for the accessory identifier has exceeded its upper limit, similarly to block 518 of process 500 described above. If so, then at block 622, host device 100 can add the accessory identifier received at block 602 to known-bad list 144.

Independently of whether the accessory identifier is added to the known-bad list, at block 624, host device 100 can determine whether the failure counter for the relevant port (i.e., the port where the connection was attempted and denied) has exceeded an upper limit. At block 626, if the upper limit is exceeded, the port can be locked out for a prescribed period (e.g., 15 minutes, 30 minutes, 1 hour, or more); at block 628, if the upper limit is not exceeded, process 600 can wait for the next attempt to access the port, returning to step 602 in the event of an attempt.

The upper limit on port failures can be set independently of the upper limit on accessory-identifier failures, but similar design considerations apply. Since the lockout period for a port can be long enough to cause inconvenience to a user who unintentionally locks out the port, it may be desirable to allow multiple failures on the port before locking it out. For example, the upper limit on failures for a given port might be 3, 7, 10, or 20.

As with the counter for accessory-identifier failures, in some embodiments, the counter for port failures can be reset when an accessory successfully connects; in other embodiments, different reset conditions can be applied. In some embodiments, the upper limit on accessory-identifier failures is lower than the limit on port failures, and adding an accessory identifier to known-bad list 622 can also result in resetting the counter for port failures. This allows accessories that are attempting to fool the authentication process to be blocked from further access without locking out the port to other accessories. On the other hand, accessories that attempt to bypass authentication entirely by supplying different identifiers each time at block 602 will lock out the port.

It will be appreciated that process 600 is illustrative and that variations and modifications are possible. Steps described as sequential may be executed in parallel, order of steps may be varied, and steps may be modified, combined, added or omitted. For instance, while process 600 includes both a known-good list and a known-bad list, the process can be modified to omit blocks associated with using or updating either list if that list is not supported; accordingly, a host device can implement a failure-based port lockout regardless of whether the host maintains a known-good list, a known-bad list, both lists, or neither list in connection with the port. It should also be noted that port lockout can be based on the number of failures to connect on the port, without regard to accessory identifier. Accordingly, port lockout as described herein can be implemented even in instances where accessories do not provide unique identifiers.

In embodiments described herein, it is assumed that any one port can provide a connection to at most one accessory at a time. A host device can have any number of ports, some or all of which can be virtual (e.g., ports defined in connection with wireless communication channels, where multiple devices can communicate using the same physical transport). Where each port is limited to one accessory connection at a time, locking out one port need not affect accessories connected on other ports.

In a host device with multiple ports, process 600 can be applied to each port separately or to multiple ports together, e.g., aggregating failure counts, known-good lists and/or known-bad lists across multiple ports. For example, it may be useful to aggregate all ports using a particular physical transport or signaling protocol, such as all the (virtual) Bluetooth ports supported by the host device. In this example, all Bluetooth connections would be locked out if block 626 in process 600 is reached; ports using a different transport (e.g., wired ports) can be but need not be locked out. During the lockout period, the host device can, as a matter of design choice, either allow any accessories that were connected and interoperating before block 626 was reached to continue interoperating (while denying any new attempts to connect), or the host can simply shut down all Bluetooth connections until the end of the lockout period (causing existing connections to be lost). As another example, in some embodiments, all ports can be locked out if the failure counter associated with any one port exceeds an upper limit.

While the invention has been described with respect to specific embodiments, one skilled in the art will recognize that numerous modifications are possible and that features described with specific reference to one embodiment can be applied in other embodiments. In some embodiments, successful authentication can be a prerequisite for any further communication using the accessory protocol, but other (limited) functionality can be supported outside of the accessory protocol without requiring authentication. For example, a charger may be able to provide power to the host device without authenticating. As another example, the host device may have ports that do not implement the accessory protocol (e.g., an analog audio-out port such as a headphone jack), and authentication need not be implemented for these ports. Thus, it is to be understood that some accessories capable of connecting to a given host may be exempt from authentication requirements.

In some embodiments, processes described separately can be combined. For example, as described above, processes 300, 400 and 500 can be implemented in the same host device, with or without the additional lockout features of process 600. As another example, a host device can implement portions of process 600 to lock out ports that are deemed under attack, regardless of whether the host device supports a known-good list, a known-bad list, both, or neither.

It should be noted that whether a particular host device maintains a known-good list and/or a known-bad list can be generally transparent to the accessory. For example, an accessory can be configured such that it sends complete identification and authentication information in response to a request from the host. If a particular host determines not to request that information (because of a known-good list or for any other reason), the accessory can simply proceed to normal interoperation upon receipt of a message indicating that the host is authorizing it to do so. Thus, the same accessory can interoperate with hosts that maintain known-good lists and/or known-bad lists, as well as hosts that do not.

In some embodiments, while authentication is in progress, the accessory can be blocked from sending any messages not related to authentication. For example, the host can ignore any such messages that may be received. In other embodiments, the host can provisionally allow at least some unrelated messages during the authentication process (e.g., by receiving and acting on them) and begin to block or ignore messages after the authentication process if the process ended in failure Likewise, in some embodiments the accessory can choose whether to ignore or process messages unrelated to authentication that it may receive during the authentication process.

Authentication can include digital certificates, signature-based authentication, and any other identity-verifying techniques. In some embodiments, an authentication process may request additional information from the accessory, including identifying information other than the unique identifier used for maintaining known-good and/or known-bad lists. As described above, an authentication process may incorporate a configuration process in which the accessory provides configuration information and the host determines whether to accept or reject the information.

Further, while the description above refers to an accessory authenticating itself to a host device that maintains a known-good list and/or a known-bad list, those skilled in the art with access to the present teachings will recognize that the roles can be reversed. Similar messages and processes can be implemented to allow a host to authenticate itself to an accessory, and the accessory can maintain a known-good list and/or a known-bad list. Thus, techniques described herein can be used in connection with communication between any electronic devices.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:
1. An electronic device comprising:
a communication interface including a port configured to connect to and communicate with another electronic device;
a connection manager coupled to the communication interface;
authentication logic coupled to the connection manager; and
a memory coupled to the connection manager and configured to store a list of known-good device identifiers and a list of known-bad device identifiers,
the connection manager being configured to:
receive a device identifier of a connected device via the communication port;

prevent the connected device from interoperating with the host device in the event that the received device identifier is on a list of known-bad device identifiers;

allow the connected device to interoperate with the electronic device via the communication port in the event that the received device identifier is on a list of known-good device identifiers;

in the event that the received device identifier is on neither the list of known-bad device identifiers nor the list of known-good device identifiers:

perform an authentication operation with the connected device via the communication port;

in the event that the authentication operation completes successfully, add the received device identifier to the list of known-good device identifiers and allow the accessory to interoperate with the electronic device; and in the event that the authentication operation does not complete successfully, prevent the connected device from interoperating with the electronic device;

detect that the connected and interoperating device has become disconnected from the communication channel;

initiate a timeout period in response to detecting that the connected and interoperating device has become disconnected; and in the event that the device identifier is not received again before the timeout period elapses, remove the device identifier from the list of known-good device identifiers.

2. The electronic device of claim 1 wherein the connection manager is further configured to:

increment a failure counter associated with the received device identifier in the event that the authentication operation does not complete successfully; and add the received device identifier to the list of known-bad device identifiers in the event that the failure counter reaches a maximum value.

3. The electronic device of claim 1 wherein the connection manager is further configured to:

increment a failure counter associated with the communication port in the event that the authentication operation does not complete successfully; and lock out the communication port for a predetermined period of time in the event that the failure counter reaches a maximum value.

4. The electronic device of claim 3 wherein the connection manager is further configured to increment incrementing the failure counter associated with the port in the event that the received device identifier is on the list of known-bad device identifiers.

5. The electronic device of claim 1 wherein the memory is further configured such that the list of known-good device identifiers is cleared when the electronic device enters a sleep state and the list of known-bad device identifiers is not cleared when the electronic device enters the sleep state.

6. A method for communicating between a host device and one or more accessories, the method comprising:

establishing, by the host device, a connection to an accessory via a communication channel, wherein establishing the connection includes receiving a unique accessory identifier from the accessory;

determining, by the host device, whether the unique accessory identifier is included in a list of known-good accessory identifiers maintained by the host device;

in the event that the unique accessory identifier is not included in the list of known-good accessory identifiers:

performing, by the host device, an authentication operation with the accessory via the communication channel;

allowing, by the host device, the accessory to interoperate with the host in the event that the authentication operation completes successfully; and adding, by the host device, the unique accessory identifier to the list of known-good accessory identifiers in the event that the authentication operation completes successfully;

in the event that the unique accessory identifier is included in the list of known-good accessory identifiers, allowing the accessory to interoperate with the host without performing the authentication operation;

detecting, by the host device after allowing the accessory to interoperate, that the accessory has become disconnected from the communication channel;

initiating, by the host device, a timeout period in response to detecting that the accessory has become disconnected; and in the event that the unique accessory identifier of the second electronic device is not received again before the timeout period elapses, removing, by the host device, the unique accessory identifier of the accessory from the list of known-good accessory identifiers.

7. The method of claim 6 wherein the unique accessory identifier includes a unique address of the accessory on the communication channel.

8. The method of claim 6 further comprising:

in the event that the unique accessory identifier is not included in the list of known-good accessory identifiers:

obtaining, by the host device, configuration information from the accessory; and in the event that the authentication operation completes successfully, storing the configuration information in association with the unique accessory identifier, wherein in the event that the unique accessory identifier is included in the list of known-good accessory identifiers, allowing the accessory to interoperate with the host includes accessing, by the host device, the stored configuration information.

9. The method of claim 6 further comprising:

determining, by the host device, the timeout period, wherein the determination is based at least in part on whether the communication channel is a wired communication channel or a wireless communication channel.

10. A computer-readable storage medium having stored thereon program instructions that, when executed by a processor of a first electronic device, cause the processor to execute a method comprising:

establishing a connection to a second electronic device via a communication channel, wherein establishing the connection includes receiving a device identifier from the second electronic device;

determining whether the device identifier is included in a list of known-good device identifiers maintained by the first electronic device;

in the event that the device identifier is not included in the list of known-good device identifiers:

performing an authentication operation with the second electronic device via the communication channel, wherein the second electronic device is allowed to interoperate with the first electronic device if the authentication operation completes successfully; and adding the device identifier to the list of known-good device identifiers in the event that the authentication operation completes successfully; and in the event that the device identifier is included in the list of known-good device identifiers, allowing the second electronic device to interoperate with the first electronic device without performing the authentication operation;

detecting, after allowing the second electronic device to interoperate with the first electronic device, that the second electronic device has become disconnected from the communication channel;

initiating a timeout period in response to detecting that the second electronic device has become disconnected; and in the event that the device identifier of the second electronic device is not received again before the timeout period elapses, removing the device identifier of the second electronic device from the list of known-good device identifiers.

11. The computer-readable storage medium of claim 10 wherein the method further includes:

clearing the list of known-good device identifiers in the event that the first electronic device enters a powered-down state.

12. An electronic device comprising:

a communication interface configured to connect to and communicate with a connected electronic device;

a connection manager coupled to the communication interface;

authentication logic coupled to the connection manager; and a memory coupled to the connection manager and configured to store a list of known-good device identifiers, the connection manager being configured to:
receive, via the communication interface, a device identifier for a connected device;
determine whether the received device identifier is included in the list of known-good device identifiers;
allow the connected device to interoperate with the electronic device via the communication interface without authentication in the event that the received device identifier is included in the list of known-good device identifiers;
use the authentication logic to perform an authentication operation with the connected device in the event that the received device identifier is included in the list of known-good device identifiers;
add the received device identifier to the list of known-good device identifiers in the event that the authentication operation completes successfully;
allow the connected device to interoperate with the electronic device via the communication interface in the event that the authentication operation completes successfully;
detect that the connected and interoperating device has become disconnected from the communication channel;
initiate a timeout period in response to detecting that the connected and interoperating device has become disconnected; and
in the event that the device identifier is not received again before the timeout period elapses, remove the device identifier of the device that has become disconnected from the list of known-good device identifiers.

13. The electronic device of claim 12 wherein the communication interface includes a wireless communication interface implementing a wireless communication protocol.

14. The electronic device of claim 13 wherein the device identifier for the connected device includes an address for the connected device according to the wireless communication protocol.

15. The electronic device of claim 12 wherein the connection manager is further configured to:

obtain configuration information from the connected device in the event that that the received device identifier is not included in the list of known-good device identifiers; and store the configuration information in association with the received device identifier in the event that the authentication operation completes successfully, wherein allowing the connected device to interoperate with the host without authentication includes accessing the stored configuration information.

16. The electronic device of claim 12 wherein the communication interface includes a first port and a second port and wherein the connection manager maintains one list of known-good device identifiers for both the first port and the second port.

17. The electronic device of claim 12 wherein the communication interface includes a first port and a second port and wherein the connection manager maintains a separate list of known-good device identifiers for each of the first port and the second port.

18. The electronic device of claim 12 wherein the memory is further configured such that the list of known-good device identifiers is cleared when the electronic device enters a sleep state.

19. A method for communicating between a host device and one or more accessories, the method comprising, by the host device:

receiving an identifier of an accessory on a communication port;

preventing the accessory from interoperating with the host device in the event that the received identifier of the accessory is on a list of known-bad accessory identifiers;

allowing the accessory to interoperate with the host device in the event that the received identifier of the accessory is on a list of known-good accessory identifiers; and in the event that the received identifier of the accessory is on neither the list of known-bad accessory identifiers nor the list of known-good accessory identifiers:
performing an authentication operation with the accessory via the communication port;
in the event that the authentication operation completes successfully, adding the received identifier of the accessory to the list of known-good accessory identifiers and allowing the accessory to interoperate with the host device; and
in the event that the authentication operation does not complete successfully, preventing the accessory from interoperating with the host device;

detecting, after allowing the accessory to interoperate, that the accessory has become disconnected from the communication port;

initiating a timeout period in response to detecting that the accessory has become disconnected; and in the event that the identifier of the accessory is not received again before the timeout period elapses, removing the identifier of the accessory from the list of known-good accessory identifiers.

20. The method of claim 19 further comprising, in the event that the authentication operation does not complete successfully:

adding the received identifier of the accessory to the list of known-bad accessory identifiers.

21. The method of claim 19 further comprising, in the event that the authentication operation does not complete successfully:

incrementing a failure counter associated with the received identifier of the accessory; and adding the received identifier of the accessory to the list of known-bad accessory identifiers in the event that the failure counter reaches a maximum value.

22. The method of claim 19 further comprising, in the event that the authentication operation does not complete successfully:

incrementing a failure counter associated with the communication port; and locking out the communication port for a predetermined period of time in the event that the failure counter reaches a maximum value.

23. The method of claim 22 further comprising incrementing the failure counter associated with the port in the event that the received identifier of the accessory is on the list of known-bad accessory identifiers.

24. The method of claim 19 further comprising, in the event that the received identifier of the accessory is on the list of known-bad accessory identifiers:

incrementing a failure counter associated with the communication port; and locking out the communication port for a predetermined period of time in the event that the failure counter reaches a maximum value.

25. The method of claim 19 further comprising:

determining, by the host device, the timeout period, wherein the determination is based at least in part on whether the communication port is a wired communication port or a wireless communication port.

* * * * *